(12) United States Patent
Loewgren

(10) Patent No.: US 8,570,534 B1
(45) Date of Patent: Oct. 29, 2013

(54) SAFETY PROTECTION METHOD AND APPARATUS FOR ADDITIVE MANUFACTURING DEVICE

(71) Applicant: ARCAM AB, Moelndal (SE)

(72) Inventor: Lars Loewgren, Haellingsjoe (SE)

(73) Assignee: Arcam AB, Moelndal (SE)

( * ) Notice: Subject to any disclaimer, the term of this patent is extended or adjusted under 35 U.S.C. 154(b) by 0 days.

(21) Appl. No.: 13/763,172

(22) Filed: Feb. 8, 2013

Related U.S. Application Data

(63) Continuation of application No. PCT/EP2012/057470, filed on Apr. 24, 2012.

(51) Int. Cl.
*G01B 11/14* (2006.01)

(52) U.S. Cl.
USPC .............................................. 356/614; 356/67

(58) Field of Classification Search
USPC ........... 356/614–624, 51, 67; 250/336.1, 372, 250/373
See application file for complete search history.

(56) References Cited

U.S. PATENT DOCUMENTS 3,882,477 A * 5/1975 Mueller ........................ 340/510
7,696,501 B2 * 4/2010 Jones ............................ 250/573

FOREIGN PATENT DOCUMENTS

| DE | 102005014483 A1 | 10/2006 |
| DE | 102007018601 A1 | 10/2008 |
| WO | WO 97/37523 A2 | 10/1997 |

OTHER PUBLICATIONS

International Searching Authority, International Search Report for International Application No. PCT/EP2012/057470, mailed Jan. 24, 2013, 1 page, European Patent Office, The Netherlands.

\* cited by examiner

*Primary Examiner* — Tri T Ton
(74) *Attorney, Agent, or Firm* — Alston & Bird LLP

(57) ABSTRACT

A method for providing safety protection in an additive manufacturing apparatus for forming a three-dimensional article through successive fusion of parts of a powder bed in an enclosable chamber, which parts corresponds to successive cross sections of the three-dimensional article is provided. The method comprising the steps of providing a position detecting device connected to a control unit to detect whether a foreign matter is within the enclosable chamber. The method may also include, upon detecting that the foreign matter is within the enclosable chamber, either (1) switching off, via the control unit, at least one device associated with the additive manufacturing apparatus; or (2) providing power to a powder suction device. Associated safety protection devices are also provided.

23 Claims, 5 Drawing Sheets

SAFETY PROTECTION METHOD AND APPARATUS FOR ADDITIVE MANUFACTURING DEVICE

CROSS-REFERENCE TO RELATED APPLICATIONS

This application is a continuation of and claims priority to and the benefit of International Application No. PCT/EP2012/057470, filed Apr. 24, 2012, the contents of which are hereby incorporated by reference in its entirety.

BACKGROUND

1. Field of the Invention

Various embodiments of the present invention relate to a method and apparatus for providing safety protection in an additive manufacturing device.

2. Description of Related Art

Freeform fabrication or additive manufacturing is a method for forming three-dimensional articles through successive fusion of chosen parts of powder layers applied to a worktable.

An additive manufacturing apparatus may comprise a work table on which said three-dimensional article is to be formed, a powder dispenser, arranged to lay down a thin layer of powder on the work table for the formation of a powder bed, an energy beam for delivering energy to the powder whereby fusion of the powder takes place, elements for control of the energy given off by the energy beam over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

An additive manufacturing apparatus comprises inter alia a beam source, a powder distributor and other mechanically moving parts which, if not securely switched off, may be harmful to an operator or service personnel. One way of making sure that the machine is safe to work with is to manually switch off the power supply to the additive manufacturing device. A problem with a completely dead device is that even the non-harmful devices are not working which may be annoying and/or problematic in some situations. Another problem is that the power switch may be forgotten to be switched off.

Additive manufacturing may also require a safe powder handling and a safe recirculation of unused powder material, meaning that only certain types of powder suction devices are allowed to be used which do not expose the powder of any kind of igniting means. Safe powder handling may also incorporate the insurance that the recirculated powder is clean from any foreign impurities which may destroy the performance of the manufactured three dimensional article, which in turn may cause a safety problem where the final article end up. Recirculated powder may be non-solidified or non-fused powder material from a previous process which is reused in a latter process. Said recirculated powder may be blended with virgin powder.

BRIEF SUMMARY

Having this background, an object of the invention is to provide methods and apparatuses for safety protection in an additive manufacturing apparatus which will reduce or eliminate the safety issues mentioned above.

According to various embodiments, a method is provided for providing safety protection in an additive manufacturing apparatus for forming a three-dimensional article through successive fusion of parts of a powder bed in an enclosable chamber, which parts corresponds to successive cross sections of the three-dimensional article. The method comprises the steps of providing a position detecting device connected to a control unit, said position detecting device being configured to detect whether a foreign matter is within said enclosable chamber; and upon detecting that said foreign matter is within said enclosable chamber, switching off, via said control unit, at least one device associated with said additive manufacturing apparatus.

At least one advantage of at least these embodiments is that harmful devices such as the beam source and powder distributor may be automatically switched off when trying to enter the enclosable chamber with for instance any foreign matter or foreign item such as any part of the body or a tool.

Foreign matter or foreign item means anything that is inserted from outside of the enclosable chamber to the inside of the enclosable chamber.

Position detecting device means a device which is capable of detecting if said foreign matter is inside or outside said enclosable chamber.

The at least one device belonging to said additive manufacturing device which is switched off may be a mechanical movable part, a power source, a light emitting source, a laser source, en electron beam source, i.e., any device belonging to the additive manufacturing device which could harmful to a human being if in operation.

According to various embodiments, another method is provided for providing safety protection in an additive manufacturing apparatus for forming a three-dimensional article through successive fusion of parts of a powder bed in an enclosable chamber, which parts corresponds to successive cross sections of the three-dimensional article. The method comprises the steps of providing a position detecting device connected to a control unit, said position detecting device being configured to detect whether a foreign matter is within said enclosable chamber; and upon detecting that said foreign matter is within said enclosable chamber, providing power to a powder suction device.

At least one advantage of this embodiment is that it reduces the risk that a certified powder suction device is used for cleaning other areas than the enclosable chamber from reusable powder.

This implies that in the event of powder spill on for instance the floor, said powder spill may not be collected by the same powder suction device as the one which is intended for collecting powder inside the enclosable chamber. This means that clean powder may only be collected from one place by a first suction device for further use. Dirty powder from other areas than the enclosable chamber, which is not to be mixed with the clean powder, is to be collected by other means for instance a second powder suction device.

The inventive methods, in this regard, not only automatically make sure that the enclosable chamber area may be safe to work in but also reduce the risk of mixing clean and dirty powder.

In one example embodiment of the present invention said position detecting device is an electromagnetic radiation curtain provided at an opening of said enclosable chamber. The electromagnetic curtain may comprise at least one electromagnetic radiation source and at least one electromagnetic radiation sensor.

Said electromagnetic radiation source may be a laser source, infra-red source or a visible light source. The advantage with an electromagnetic curtain as a position detecting device is that it is a cheap, well known and reliable solution. The number of electromagnetic sources and detectors may be chosen arbitrarily. A benefit with a larger number is that the dimension or even the structure of the item may be recognized.

In another example embodiment of the present invention said position detecting device may be a measurement arm or a robot arm capable of registering the position in space.

Said robot arm or measurement arm may work in cooperation with said electromagnetic radiation curtain or without assistance from said electromagnetic radiation curtain.

In yet another example embodiment said method further comprising the step of providing a hose from said powder suction device to said robot arm.

An advantage with said embodiment is that the probability of personal injuries and mixing of powder is even further reduced since the powder handling may be performed without assistance of a human being.

In still another example embodiment of the present invention said enclosable chamber is a vacuum chamber. By enclosing the powder bed in a vacuum chamber an electron beam may be used as a source for fusing parts in the powder bed.

In yet another example embodiment of the present invention said item is a nozzle of said powder suction device. This means that as soon as the nozzle enters the enclosable chamber one or more of the devices belonging to the additive manufacturing apparatus are switched off while the powder suction device is provided with power.

In still another example embodiment of the present invention said method further comprising the step of switching on said powder suction device by pressing an on switch. This means that the powder suction device has actively to be turned on and this can only be done as a foreign item such as the nozzle of said powder suction device enters the enclosable chamber.

In still another example embodiment of the present invention said electromagnetic radiation source is a laser source, infra-red source or a visible light source. This means that any electromagnetic radiation source and a corresponding sensor sensitive to said electromagnetic radiation may be used as a position detecting sensor. The number of radiation sources and corresponding sensors may be chosen arbitrary from one to as many as will fit in the available space.

In still another example embodiment of the present invention said device is at least one of electron beam, laser beam, powder distributor, vacuum pump, gas supply, work table. Disconnecting one or more of the above mentioned devices will greatly improve the service and operation of the additive manufacturing apparatus.

In still another example embodiment of the present invention said powder suction device is an external unit in relation to the enclosable chamber. This means that any suitable powder suction device may be used. The power to said powder suction device may be dependent on the presence of any foreign item in the enclosable chamber.

Another object of the present invention is to provide safety protection devices in an additive manufacturing apparatus which will reduce or eliminate the safety issues mentioned above.

According to various embodiments, a safety protection device in an additive manufacturing apparatus for forming a three-dimensional article through successive fusion of parts of a powder bed in an enclosable chamber, which parts corresponds to successive cross sections of the three-dimensional article is provided. The safety protection device comprises: a position detecting device connected to a control unit, said position detecting device being configured to detect whether a foreign matter is within said enclosable chamber; and a switch for switching off at least one device associated with said additive manufacturing apparatus, said switch being controlled by said control unit and being activated when said position detecting device detects that said foreign matter is within said enclosable chamber.

In another example embodiment said safety device still further comprises a powder suction device that is controlled by a control unit such that the powder suction device only received power when said position detecting device detects that said foreign matter is within said enclosable chamber.

In another example embodiment said position detecting device is an electromagnetic radiation curtain provided at an opening of said enclosable chamber, said electromagnetic curtain comprising at least one electromagnetic radiation source and at least one electromagnetic radiation sensor.

In still another example embodiment said enclosable chamber is a vacuum chamber.

In yet another example embodiment said position detecting device may be a measurement arm or a robot arm capable of registering the position in space, wherein said foreign matter is a nozzle of said powder suction device provided to said robot arm.

In still another example embodiment said electromagnetic radiation source is a laser source, infra-red source or a visible light source.

In still another example embodiment said device is at least one of electron beam, laser beam, powder distributor, vacuum pump, gas supply, work table.

According to various embodiments, another safety protection device in an additive manufacturing apparatus for forming a three-dimensional article through successive fusion of parts of a powder bed in an enclosable chamber, which parts corresponds to successive cross sections of the three-dimensional article is provided. The safety protection device comprises: a position detecting device connected to a control unit, said position detecting device being configured to detect whether a foreign matter is within said enclosable chamber; and a powder suction device configured such that said control unit only provides power to said powder suction device when said position detecting device detects that said foreign matter is within said enclosable chamber.

In certain embodiments, wherein said position detecting device is an electromagnetic radiation curtain provided at an opening of said enclosable chamber, said electromagnetic curtain comprising at least one electromagnetic radiation source and at least one electromagnetic radiation sensor. In at least one such embodiment, each of said at least one electromagnetic radiation sensors are positioned adjacent and spaced apart relative to one another along substantially an entirety of a first side of said opening; each of said at least one electromagnetic radiation sensors are positioned adjacent and spaced apart relative to one another along substantially an entirety of a second side of said opening, said second side being opposite said first side relative to said opening; and each of said at least one electromagnetic radiation sensors are configured, based at least in part upon their relative positioning, to receive an emission from a corresponding one of each of said at least one electromagnetic radiation sources, said transmission and receipt of said emission defining said electromagnetic radiation curtain across at opening.

More or less the same advantages of the example embodiment of the method will apply to the above example embodiments of the device.

BRIEF DESCRIPTION OF THE SEVERAL VIEWS OF THE DRAWING(S)

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Various embodiments will now be described more fully hereinafter with reference to the accompanying drawings, in which some, but not all embodiments of the inventions are shown. Indeed, the various embodiments of the present invention may be embodied in many different forms and should not be construed as limited to the embodiments set forth herein; rather, these embodiments are provided so that this disclosure will satisfy applicable legal requirements.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 2:
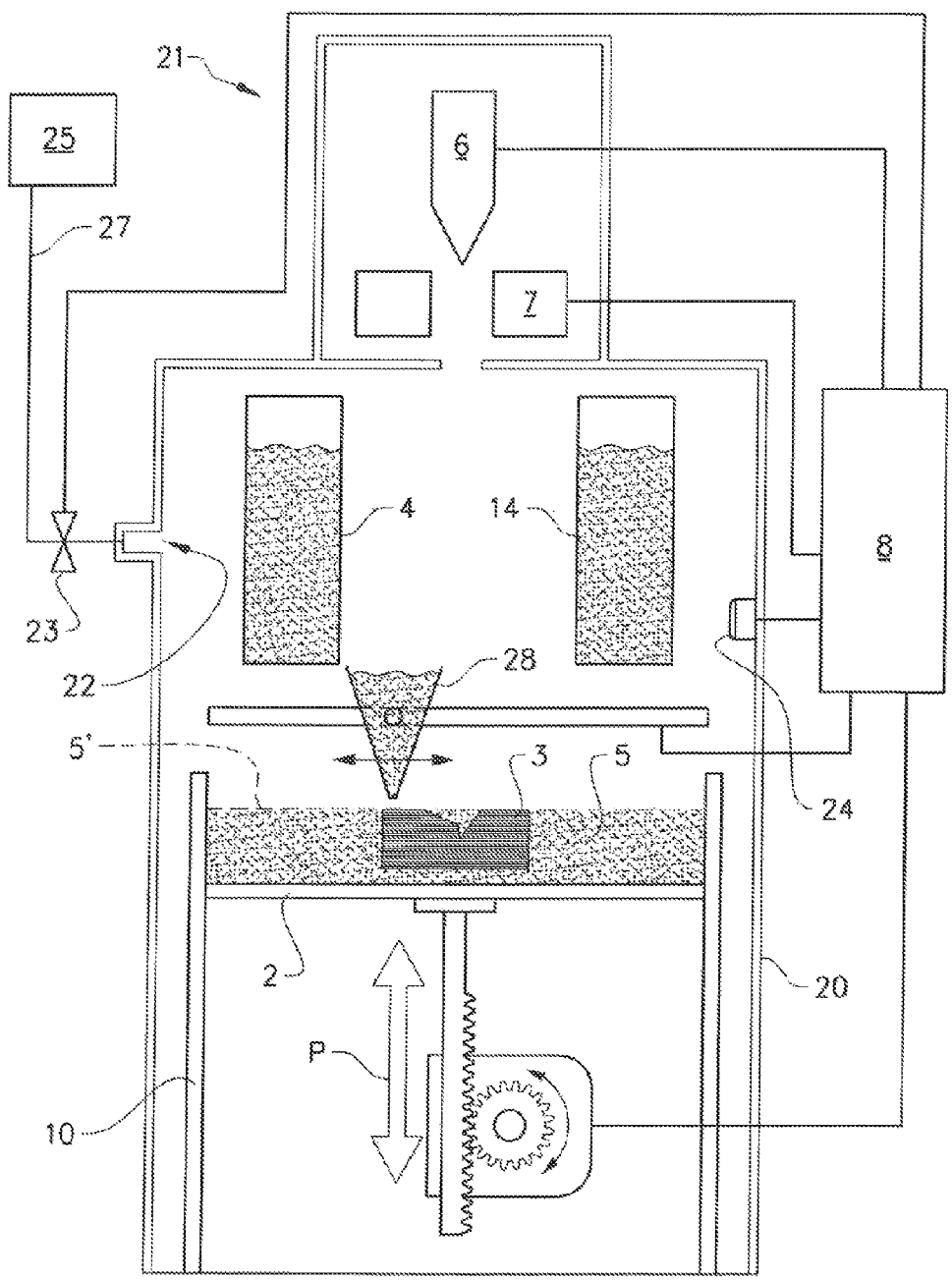
FIG. 2 shows, in a schematic view, an example embodiment of a device for producing a three dimensional product, in which device the inventive method and device can be applied.

FIG. 2 depicts an embodiment of a freeform fabrication or additive manufacturing apparatus 21 in which the inventive method and device according to the present invention may be implemented.

Said apparatus 21 comprising an electron beam gun 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. At least a portion of the electron beam gun 6 may be provided in the vacuum chamber 20. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to said control unit 8. In an example embodiment of the invention said electron beam gun 6 generates a focusable electron beam with an accelerating voltage of about 15-60 kV and with a beam power in the range of 3-10 Kw. The pressure in the vacuum chamber may be $10^{-3}$ mbar or lower when building the three-dimensional article by fusing the powder layer by layer with the energy beam.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based superalloys etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws etc.

An electron beam may be directed over said build platform 2 causing said first powder layer to fuse in selected locations to form a first cross section of said three-dimensional article. The beam is directed over said build platform 2 from instructions given by the control unit 8. In the control unit 8 instructions for how to control the electron beam for each layer of the three-dimensional article is stored.

After a first layer is finished, i.e., the fusion of powder material for making a first layer of the three-dimensional article, a second powder layer is provided on said build platform 2. The second powder layer is preferably distributed according to the same manner as the previous layer. However, there might be alternative methods in the same additive manufacturing machine for distributing powder onto the work table. For instance, a first layer may be provided by means of a first powder distributor 28, a second layer may be provided by another powder distributor. The design of the powder distributor is automatically changed according to instructions from the control unit 8. A powder distributor 28 in the form of a single rake system, i.e., where one rake is catching powder fallen down from both a left powder hopper 4 and a right powder hopper 14, the rake as such can change design.

After having distributed the second powder layer on the build platform, the energy beam is directed over said work table causing said second powder layer to fuse in selected locations to form a second cross section of said three-dimensional article. Fused portions in the second layer may be bonded to fused portions of said first layer. The fused portions in the first and second layer may be melted together by melting not only the powder in the uppermost layer but also remelting at least a fraction of a thickness of a layer directly below said uppermost layer.

In the case where an electron beam is used, it is necessary to consider the charge distribution that is created in the powder as the electrons hit the powder bed 5. The invention is, at least partly, based on the realization that the charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

Figure 1:
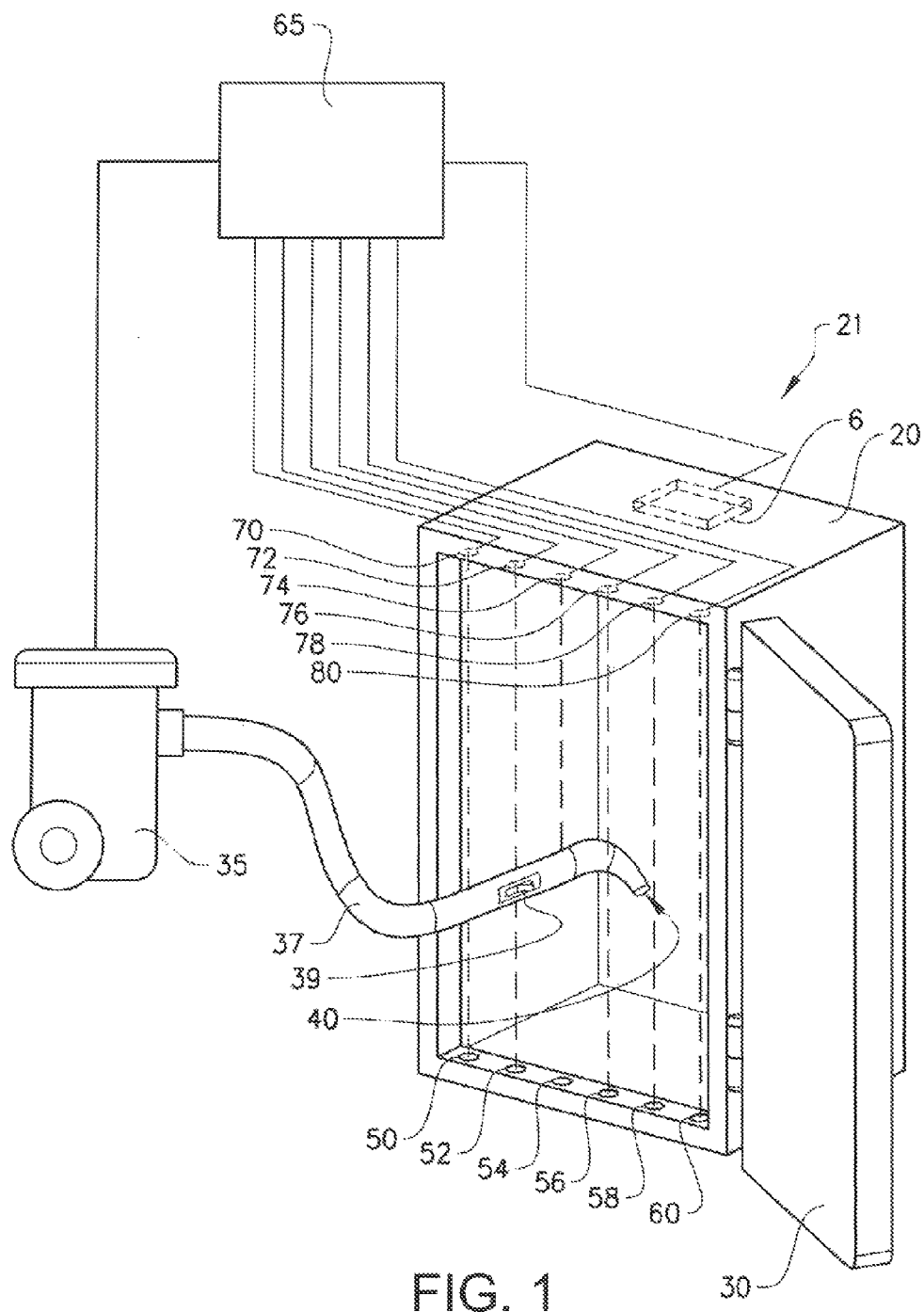
FIG. 1 depicts a first example embodiment of a device according to the present invention.

FIG. 1 illustrates schematically an additive manufacturing device 21 with the inventive safety protection device.

Three-dimensional articles may be manufactured inside the enclosable chamber 20 through successive fusion of parts of a powder bed, which parts corresponds to successive cross sections of the three-dimensional article as described above in connection with FIG. 2. The enclosable chamber 20 comprises a door 30. When the door is closed vacuum may be provided inside said enclosable chamber. The vacuum may be accomplished through one or several vacuum pumps (not illustrated) connected to said enclosable chamber.

Said safety device comprising a position detecting device connected to a control unit 65 to detect if a foreign item is within said enclosable chamber. In FIG. 1 said position detecting device is in the form of electromagnetic emitting devices 50, 52, 54, 56, 68, 60 and electromagnetic sensors 70, 72, 74, 76, 78 80. The sensors 70, 72, 74, 76, 78 80 are connected to the control unit 65. The control unit registers if each and every sensor is receiving or not receiving the electromagnetic radiation emitted from the emitting devices 50, 52, 54, 56, 68, 60.

Said safety device further comprising a switch (not illustrated) for switching off at least one device belonging to said additive manufacturing apparatus 21 controlled by said control unit 65 when said position detecting device 50, 52, 54, 56, 68, 60, 70, 72, 74, 76, 78 80 is detecting said foreign item to be within said enclosable chamber. A foreign item may be detected if one or more of the sensors 70, 72, 74, 76, 78 80 does not receive the electromagnetic radiation emitted by the emitting devices 50, 52, 54, 56, 68, 60 because the foreign item is breaking the electromagnetic connection between the emitting device 50, 52, 54, 56, 68, 60 and said sensor 70, 72, 74, 76, 78 80. The foreign item may for instance be any part of the body or a tool. The tool may for instance be a nozzle 40 of a powder suction device 35.

Figure 3:
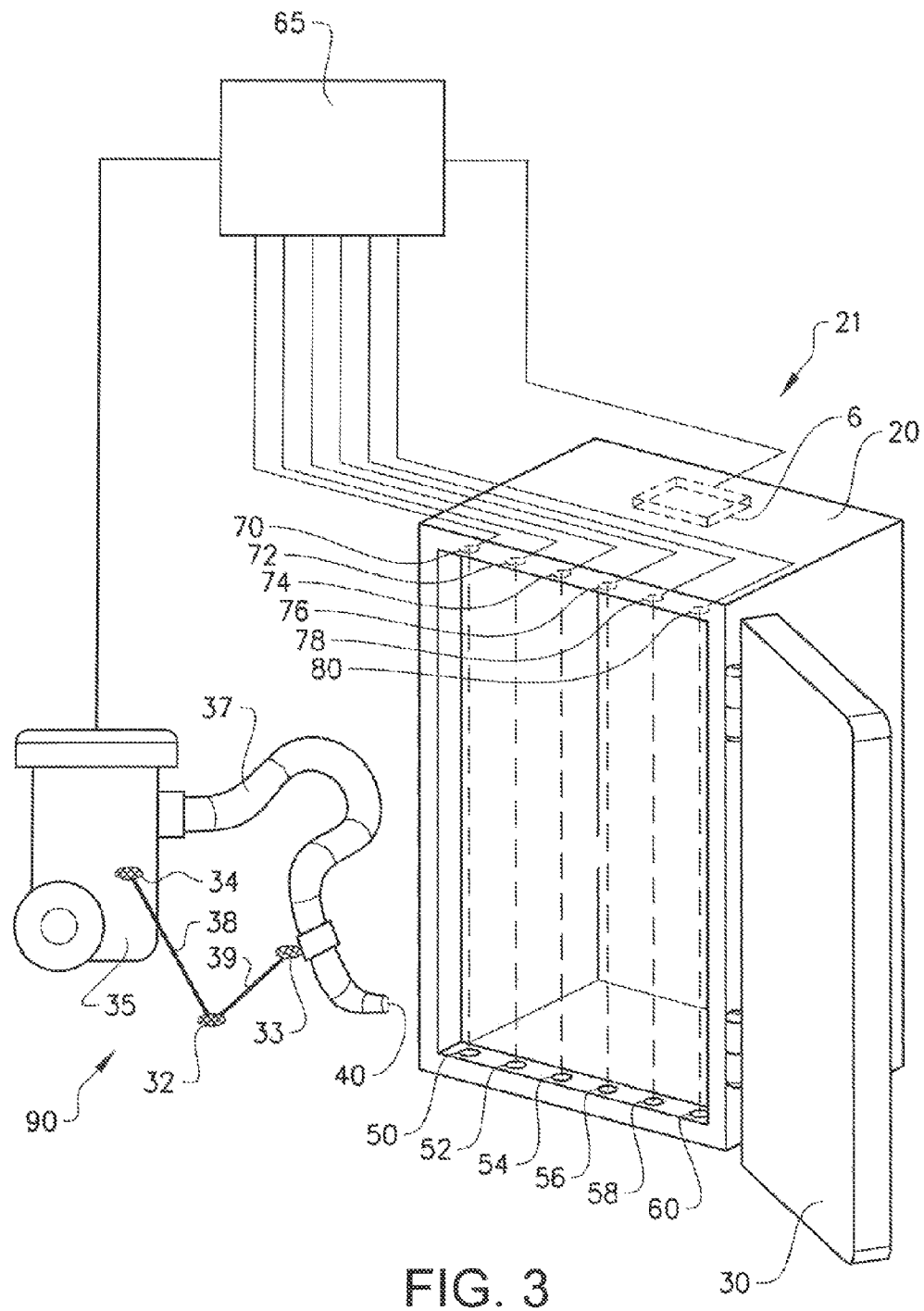
FIG. 3 depicts a second example embodiment of a device according to the present invention.

The number of emitting devices in FIG. 3 is exemplified to be 6, however, any number of emitting devices and corresponding number of sensors may be used. Of course, using only one sensor in a wide opening would increase the risk of missing any item that is inside the enclosable chamber. If using a larger number of sensors and emitters, which are close to each other, said sensors and emitters may be used to estimate the size and form of the foreign item breaking the electromagnetic connection between the emitting device 50, 52, 54, 56, 68, 60 and said sensor 70, 72, 74, 76, 78 80.

When at least one electromagnetic connection is broken between the emitting device 50, 52, 54, 56, 68, 60 and said sensor 70, 72, 74, 76, 78 80, the control unit 65 receives a signal that said sensor(s) are missing the signal from the emitter(s). The control unit 65 then disconnect at least one device belonging to the additive manufacturing apparatus 21, for instance an electron gun 6, a powder distributor system or any other mechanically moving part attached inside or outside the enclosable chamber 20. Said control unit also switches on the power to a powder suction device 35 when said at least one electromagnetic connection is broken between the emitting device 50, 52, 54, 56, 68, 60 and said sensor 70, 72, 74, 76, 78 80.

It requires a foreign matter detected to be inside the enclosable chamber 20 in order to provide power to the powder suction device and the means for managing this is the control unit 65. The powder suction device is useless as long as there is no foreign matter inside the enclosable chamber. Said foreign matter may for instance be the nozzle 40 provided on a hose 37 connected to said powder suction device 35. Said foreign matter may also be a tool, any part of a human body or any other part which is moved from the outside of the enclosable chamber to the inside of the enclosable chamber.

The actual on-switching of said powder suction device may be performed by an on-switch 39 provided on the powder suction device 35 as such or in the vicinity of the nozzle 40. This means that it may require require two events for switching on the powder suction device, firstly there may have to be a foreign matter inside the enclosable chamber 20 and secondly the on switch 39 may have to be activated (switched on).

Figure 4:
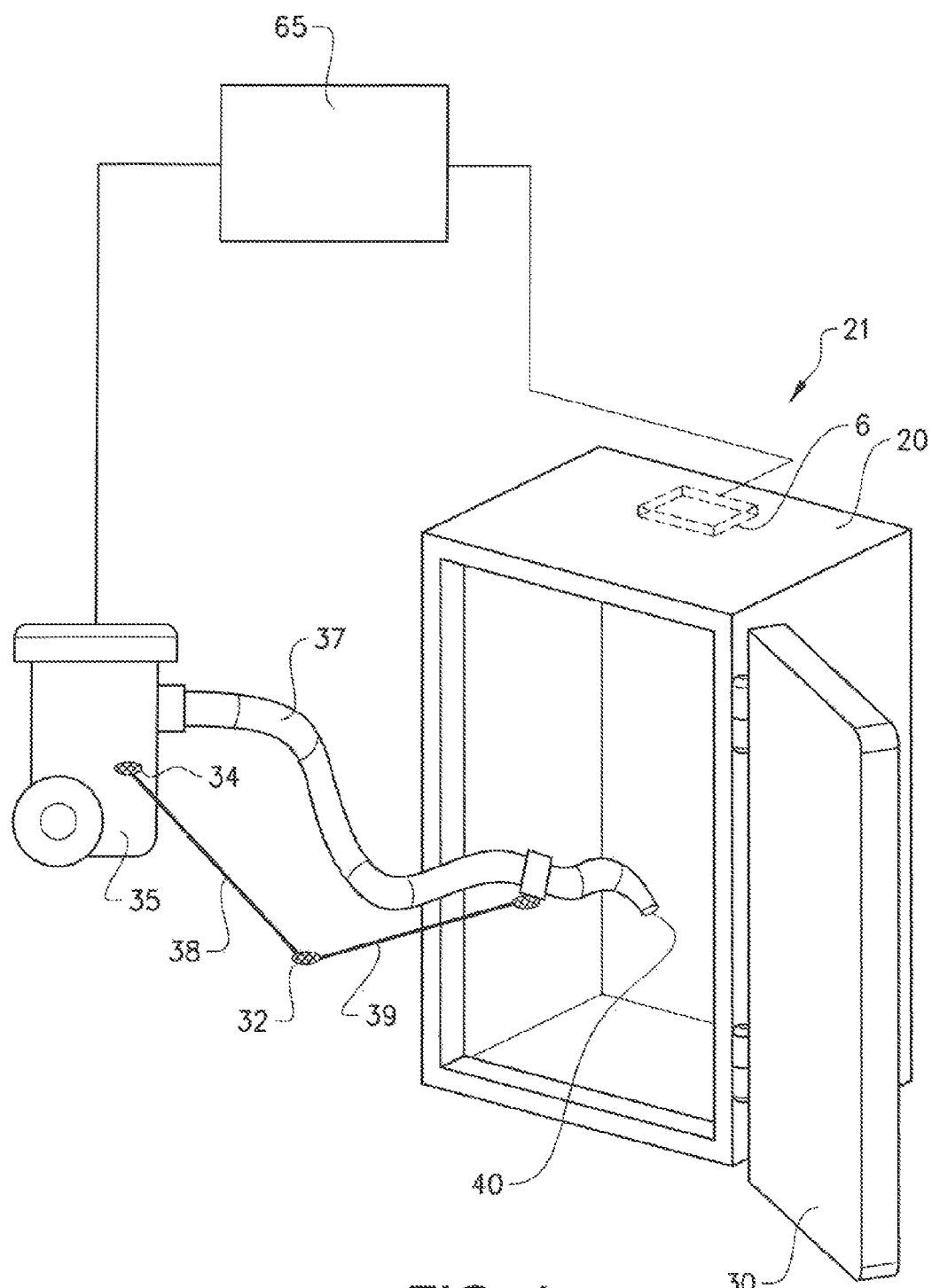
FIG. 4 depicts a third example embodiment of a device according to the present invention.

FIG. 4 illustrates another example embodiment of a position detecting device. Here the position detecting device may be a robot arm or a measurement arm 90 (see also FIG. 3) having a first rotational axis 34 and a second rotational axis 32. Between the first rotational axis 34 and the second rotational axis it s provided a first arm 38. A second arm 39 is provided at said second rotational axis with its first end. A second and of said second arm may be provided with a gripping device 33. To said gripping device 33 may said powder suction hose 37 or powder suction nozzle 40 be attached. The measurement arm may be manufactured by Baces3D.

In one embodiment the distance between the powder suction device 35 and the additive manufacturing apparatus 21 is fixed. A first angle of the first arm 38 relative to a predetermined position and a second angle of the second arm 39 relative said first arm 38 then determined the position of the grip device 33 (see also FIG. 3). Assuming that the grip device is gripping the powder suction device at a predetermined position one can then determine the position of the nozzle from said first and second angles. There will be a given set of first and second angles for which said nozzle 40 can be said to be within the enclosable chamber 20, given that the grip device 33 is gripping the hose 37 at a predetermined position, from which predetermined position the distance to the nozzle 40 is known. Once said grip device 33 of said robot arm or measurement arm 90 or any tool attached to the grip device is within said enclosable chamber 20 the control unit 65 switches off at least one device 6 belonging to the additive manufacturing apparatus. Said control unit 65 also switches on the power to the powder suction device 35 when said grip device 33 of said robot arm or measurement arm 90 or any tool (such as the nozzle 40 of the powder suction device 35) attached to the grip device is within said enclosable chamber 20.

FIG. 3 is a combination of the embodiment in FIG. 1 and FIG. 4. In FIG. 3 a robot arm or measurement arm 90 and an electromagnetic emitters and sensors are used as position detecting devices. The determination of the position of the grip device 33 or any tool attached to said grip device may be determined in the same way as disclosed in relation to FIG. 4. The functionality of the electromagnetic emitting and sensing devices are equal to what is disclosed in relation to FIG. 1. In FIG. 3 the power to any predetermined number of devices 6 belonging to the additive manufacturing apparatus 21 may be switched off when at least one of the electromagnetic sensors 70, 72, 74, 76, 78, 80 is not receiving the electromagnetic radiation from the corresponding emitters 50, 52, 54, 56, 58, 60. However, for providing power to the powder suction device 35 it requires not only that at least one of the sensors is not receiving the electromagnetic radiation from its corresponding emitter. It also requires that the grip device or a predefined part of the robot or measurement arm is determined to be within the enclosable chamber given by the position of the measurement or robot arm. This embodiment has the advantage that the powder suction device cannot be manipulated to start in a "wrong" area to thereby give the possibility to collect dirty powder from for example the floor. In FIG. 3, the grip device or any tool attached to the grip device, such as the hose from the powder suction device, has to be identified to be within the enclosable chamber in order to provide power to the powder suction device. The actual on-switching of the powder suction device can be automatically, i.e., as soon as the nozzle is determined to be within the enclosable chamber. Another alternative to switch on the powder suction device is to press an on switch. However, the on switch will not be active unless the nozzle is determined to be within the enclosable chamber.

Figure 5:
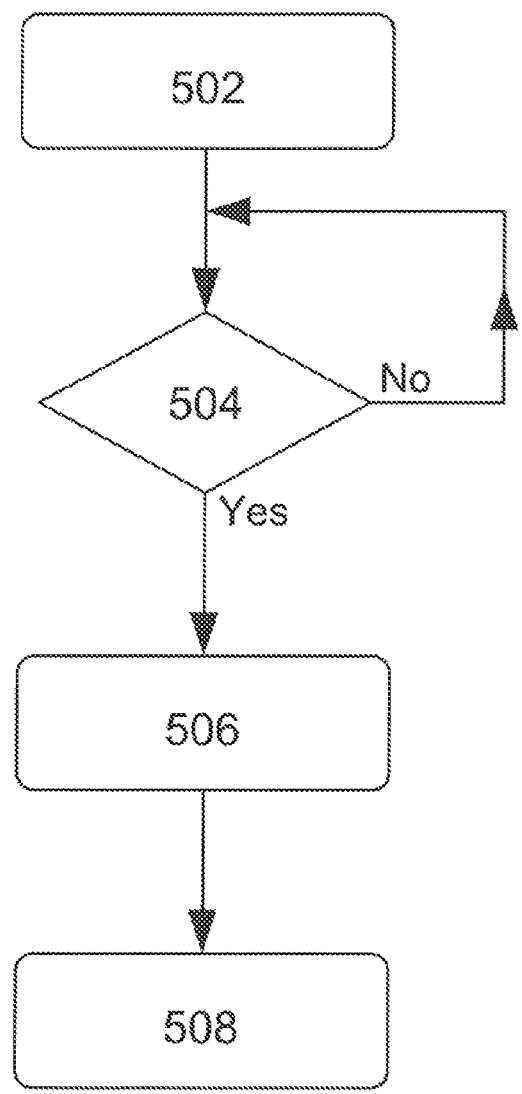
FIG. 5 depicts an example embodiment of a flow chart of an inventive method according to the present invention.

FIG. 5 depicts schematically an example embodiment of a flow chart of an inventive method for providing safety protection in an additive manufacturing apparatus according to the present invention.

In a first step 502 a position detecting device is provided which is connected to a control unit to detect if a foreign item is within said enclosable chamber. The position detecting device may be a robot arm or a measurement arm and/or at least one electromagnetic sensor and corresponding electromagnetic emitting device as disclosed above.

Then it is determined if a foreign item is within the enclosable chamber 20. The question to be answered in box 504 is, is any foreign item within the enclosable chamber? If the answer is NO, the same question is asked again within a predetermined time frame. The time frame may be in the range of microseconds. If the answer is YES it is a foreign item is within the enclosable chamber 20, the method is moved to the second step 506. In the second step 506 at least one device of the additive manufacturing apparatus is switched off. When said step is completed the method moves on to the third step 508. In the third step 508 providing the powder suction device is provided with power.

In an alternative embodiment of said method said at least one device belonging to the additive manufacturing apparatus is switched off if at least one of the sensors 70, 71, 74, 76, 78, 80 is not receiving the electromagnetic radiation emitted from a corresponding emitter 50, 52, 54, 56, 68, 60. The power to the powder suction device is provided when the grip device or any predefined part of the measurement arm or the robot arm or a tool attached to said grip arm is determined to be within said enclosable chamber 20.

In still an alternative embodiment of said method said at least one device belonging to the additive manufacturing apparatus is switched off when for instance the grip device of the robot arm or measurement arm or a tool attached to said grip arm is determined to be within said enclosable chamber 20. The power to the powder suction device is provided when the grip device of the robot arm or measurement arm or a tool attached to said grip arm is determined to be within said enclosable chamber 20.

The invention is not limited to the above-described embodiments and many modifications are possible within the scope of the following claims. Such modifications may, for example, involve using a different source of energy beam than the exemplified electron beam such as laser beam. Other materials than metallic powder may be used, such as powder of polymers or powder of ceramics. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing safety protection during formation of a three-dimensional article through successive fusion of parts of a powder bed in an enclosable chamber, which parts corresponds to successive cross sections of the three-dimensional article, said method comprising the steps of:
providing a position detecting device connected to a control unit of an additive manufacturing apparatus configured for forming said three-dimensional article, said position detecting device being configured to detect a position location of a foreign matter within said enclosable chamber; and
upon detecting said position location of said foreign matter within said enclosable chamber, switching off, via said control unit, at least one device associated with said additive manufacturing apparatus.

2. The method according to claim 1, further comprising the step of, upon detecting that said foreign matter is within said enclosable chamber, providing power to a powder suction device.

3. The method according to claim 1, wherein said position detecting device is an electromagnetic radiation curtain provided at an opening of said enclosable chamber, said electromagnetic curtain comprising at least one electromagnetic radiation source and at least one electromagnetic radiation sensor, each of the at least one electromagnetic radiation sensors being configured to receive an emission from a corresponding one of said at least one electromagnetic radiation sensors so as to define said electromagnetic curtain.

4. The method according to claim 1, wherein said position detecting device is at least one of a measurement arm and a robot arm capable of registering the position in space.

5. The method according to claim 4, wherein:
said method further comprises the step of providing a hose from said powder suction device to said robot arm; and
said step of switching off said at least one device associated with said additive manufacturing apparatus occurs when said hose enters said enclosable chamber.

6. The method according to claim 1, wherein said enclosable chamber is a vacuum chamber.

7. The method according to claim 1, wherein said foreign matter is a nozzle of said powder suction device.

8. The method according to claim 2, further comprising the step of, upon providing power to said powder suction device, switching on said powder suction device by pressing a mechanical switch.

9. The method according to claim 1, wherein said electromagnetic radiation source is at least one of a laser source, an infra-red source, and a visible light source.

10. The method according to claim 1, wherein said device associated with said additive manufacturing apparatus is at least one of an electron beam, a laser beam, a powder distributor, a vacuum pump, a gas supply, and a work table.

11. The method according to claim 1, wherein said powder suction device is an external unit in relation to the enclosable chamber.

12. A method for providing safety protection during formation of a three-dimensional article through successive fusion of parts of a powder bed in an enclosable chamber, which parts corresponds to successive cross sections of the three-dimensional article, said method comprising the steps of:
   providing a position detecting device connected to a control unit of an additive manufacturing apparatus configured for forming said three-dimensional article, said position detecting device being configured to detect a position location of a foreign matter within said enclosable chamber; and
   upon detecting said position location of said foreign matter within said enclosable chamber, providing power to a powder suction device.

13. The method according to claim 12, further comprising the step of, upon detecting that said foreign matter is within said enclosable chamber, switching off, via said control unit, at least one device associated with said additive manufacturing apparatus.

14. A safety protection device for forming a three-dimensional article through successive fusion of parts of a powder bed in an enclosable chamber, which parts corresponds to successive cross sections of the three-dimensional article, said safety device comprising:
   a position detecting device connected to a control unit of an additive manufacturing apparatus configured for forming said three-dimensional article, said position detecting device being configured to detect a position location of a foreign matter within said enclosable chamber; and
   a switch for switching off at least one device associated with said additive manufacturing apparatus, said switch being controlled by said control unit and being activated when said position detecting device detects said position location of said foreign matter within said enclosable chamber.

15. The safety protection device according to claim 14, wherein said control unit is configured to provide power to a powder suction device only when said position detecting device detects that said foreign matter is within said enclosable chamber.

16. The safety protection device according to claim 14, wherein said position detecting device is an electromagnetic radiation curtain provided at an opening of said enclosable chamber, said electromagnetic curtain comprising at least one electromagnetic radiation source and at least one electromagnetic radiation sensor.

17. The safety protection device according to claim 16, wherein:
   each of said at least one electromagnetic radiation sensors are positioned adjacent and spaced apart relative to one another along substantially an entirety of a first side of said opening;
   each of said at least one electromagnetic radiation sensors are positioned adjacent and spaced apart relative to one another along substantially an entirety of a second side of said opening, said second side being opposite said first side relative to said opening; and
   each of said at least one electromagnetic radiation sensors are configured, based at least in part upon their relative positioning, to receive an emission from a corresponding one of each of said at least one electromagnetic radiation sources, said transmission and receipt of said emission defining said electromagnetic radiation curtain across at opening.

18. The safety protection device according to claim 14, wherein said enclosable chamber is a vacuum chamber.

19. The safety protection device according to claim 14, wherein:
   said position detecting device is at least one of a measurement arm and a robot arm, at least a portion of said measuring arm and robot arm being configured to register the position thereof in space; and
   said foreign matter is a nozzle of said powder suction device operatively fixed relative to said robot arm.

20. The safety protection device according to claim 14, wherein said electromagnetic radiation source is at least one of a laser source, an infra-red source, and a visible light source.

21. The safety protection device according to claim 14, wherein said device associated with said additive manufacturing apparatus is at least one of an electron beam, a laser beam, a powder distributor, a vacuum pump, a gas supply, and a work table.

22. A safety protection device for forming a three-dimensional article through successive fusion of parts of a powder bed in an enclosable chamber, which parts corresponds to successive cross sections of the three-dimensional article, said safety device comprising:
   a control unit of an additive manufacturing apparatus configured for forming said three-dimensional article, said position detecting device being configured to detect a position location of a foreign matter within said enclosable chamber; and
   a powder suction device configured such that said control unit only provides power to said powder suction device when said position detecting device detects said position location of said foreign matter within said enclosable chamber.

23. The safety protection device according to claim 22, further comprising a switch for switching off at least one device associated with said additive manufacturing apparatus, said switch being controlled by said control unit and being activated when said position detecting device detects that said foreign matter is within said enclosable chamber.

* * * * *

UNITED STATES PATENT AND TRADEMARK OFFICE
CERTIFICATE OF CORRECTION

PATENT NO. : 8,570,534 B1  
APPLICATION NO. : 13/763172  
DATED : October 29, 2013  
INVENTOR(S) : Loewgren Page 1 of 1

It is certified that error appears in the above-identified patent and that said Letters Patent is hereby corrected as shown below:

Title Page insert item --(65)     Prior Publication Data

US 2013/0278920 A1     Oct. 24, 2013--

Signed and Sealed this  
Twenty-fifth Day of February, 2014

Michelle K. Lee  
*Deputy Director of the United States Patent and Trademark Office*